United States Patent [19]
Olds

[11] 3,804,356
[45] Apr. 16, 1974

[54] FLEXIBLE SUPPORT DEVICE FOR CAMERAS

[76] Inventor: Mac L. Olds, 7145 W. 94th St., Los Angeles, Calif. 90045

[22] Filed: Mar. 29, 1973

[21] Appl. No.: 346,144

[52] U.S. Cl............................248/179, 354/81
[51] Int. Cl. ............................................ G03b 17/56
[58] Field of Search........................ 95/86; 248/179

[56] References Cited
UNITED STATES PATENTS
3,353,776  11/1967  Clemens ............................ 95/86 X
2,684,822  7/1954  Odin ................................. 248/179

*Primary Examiner*—John M. Horan
*Attorney, Agent, or Firm*—Francis X. Lo Jacono, Sr.

[57] ABSTRACT

A flexible support device for cameras which is disposed and removably affixed between a camera and a stationary mounting unit, the support device having a main central flexible body consisting of a spring-like continuous coil attached at its lower end to a mounting plate, and having the upper opposite end thereof secured to a base plate to which a mounting head is rotatably attached thereto, the mounting head being provided with an extended threaded shaft for attachment to a camera.

2 Claims, 6 Drawing Figures

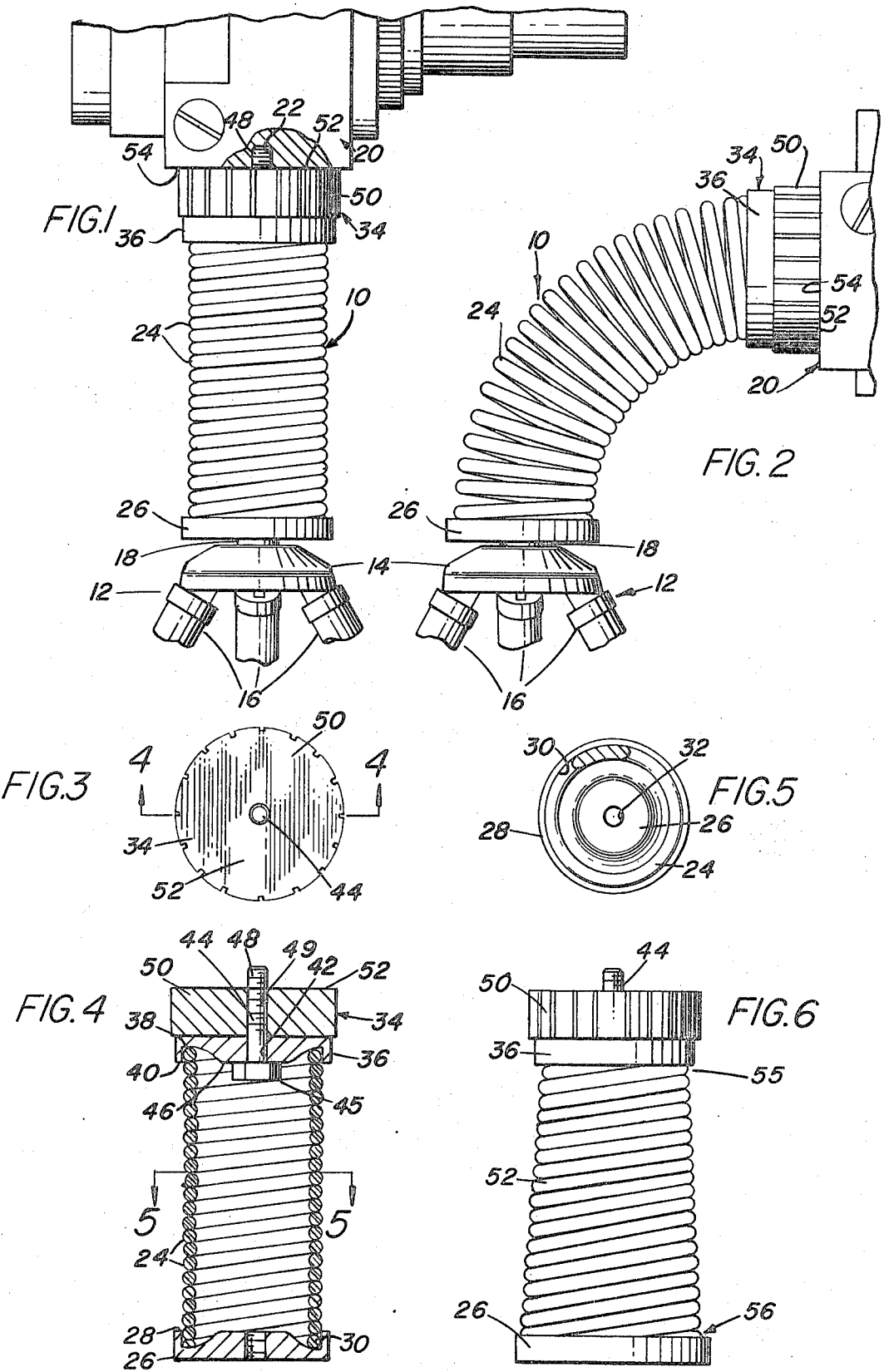

FLEXIBLE SUPPORT DEVICE FOR CAMERAS

BACKGROUND

1. Field of the Invention

This invention relates generally to a mounting device for both still and movie cameras, and more particularly to a flexible support device for attachment between a camera and a substantially stationary mounting unit.

2. Description of the Prior Art

As is well known in the art of photography, there are various mounting and supporting devices and units to which both still and movie cameras are attached so that more controlled picture taking can be accomplished. However, due to the more complicated and wide range of accessories being incorporated within cameras, various problems and difficulties are now being encountered when a camera is mounted to a stationary mount such as, for example, a tripod unit. These units are generally provided with restraining clamps whereby the camera can be positioned at various angles and then locked into a set position. Hence a problem arises. How does one move the camera relative to the mounting unit when it is in a locked position, with one hand normally operating the camera shutter release and the other hand operating a different accessory, such as the control for a "zoom" lens? Thus, a need has been created for the camera to be rotated about a 360° perimeter, yet providing stability along with flexibility so that a picture can also be taken in either an upwardly or downwardly inclined position relative to the normal horizontal operating position. Present devices of which the applicant is aware are not capable of providing the needed solutions to the above problems.

SUMMARY

The present invention comprises an elongated, substantially tubular flexible body made up primarily of a single continuous coil of wire forming a substantially spring-like element. The lower end of the coiled body terminates at and is affixed to a mounting plate having a threaded opening therein so that it can be removably secured to a stationary mounting unit, such as a tripod or the like.

Similarly, the upper terminated end of the coiled body is also secured to a base plate, to which is coupled a rotatable mounting head having a diameter larger than the base plate. In order to provide for the necessary rotatable contiguous placement of the mounting head in relation to the base plate, there is provided a threaded pin or shaft which is freely received within an aperture in the base plate, the pin having a head member, adjacent the aperture on the shaft portion, which is projected upwardly and received within a threaded bore of the head, whereby the pin and head rotate together about the central axis of the device.

The pin extends from the outer face surface so as to firmly engage the matching threaded hole found in the underside of the camera.

Accordingly, when the threaded pin is brought into contact with the camera mounting hole, the head is rotated, thus screwing the pin therein and causing a firm hold between the bottom surface of the camera and the upper face surface of the mounting head. However, the head is still free to rotate 360° about its central axis along with the pin. Also, at this time the camera can be geniculated either upwardly or downwardly, as required, and this bending movement can be accomplished along any point of the 360° perimeter — that is, it can be bent from side to side, as well as forward and backward, and at the same time be pivoted about the fixed support.

There is also disclosed an alternative embodiment wherein the coiled body is formed as a truncated cone-shaped configuration, the coiled body having a smaller diameter at its upper terminating end and a larger diameter at its lower end. Thus, in such a configuration a greater bending movement is provided at the lower end, relieving the stress, strain and load that might be applied to the camera itself.

OBJECTS AND ADVANTAGES

The present invention has for an important object the provision of a flexible support device for cameras, said device being positioned intermediate the camera and a substantially fixed mounting unit, such as a tripod or the like, whereby the camera can be moved with unlimited freedom of direction.

It is another object of the invention to provide a flexible support device for cameras that is operable during the normal course of picture taking without the operator thereof losing control of the camera — such as, for example, when the operator has one hand working the camera shutter release and the other hand operating the "zoom" lens, the camera can still be positioned at various degrees of angles relative to its fixed support.

Still another object of the invention is to provide a device of this character that is relatively inexpensive to manufacture.

A further object of the invention is to provide a flexible camera support of this character which comprises a minimum of parts and members.

A still further object of the invention is to provide a flexible support device for cameras that is simple and rugged in construction, and easy to operate.

Other characteristics, advantages and objects of this invention can be more readily appreciated from the following description and appended claims. When taken in conjunction with the accompanying drawings, this description forms a part of the specification wherein like references and characters designate corresponding parts in several views.

DESCRIPTION OF THE DRAWINGS

Referring more particularly to the accompanying drawings, which are for illustrative purposes only:

FIG. 1 is a side-elevational view of the invention attached to a tripod and having a camera secured to the upper end thereof;

FIG. 2 is a view similar to FIG. 1 with the flexible support device in one of its operating modes;

FIG. 3 is a top plan view of the device;

FIG. 4 is a cross-sectional view taken along line 4—4 of FIG. 3;

FIG. 5 is a cross-sectional view taken substantially along line 5—5 of FIG. 4; and FIG. 6 is a side-elevational view of an alternative arrangement of the present invention.

DESCRIPTION OF THE PREFERRED EMBODIMENT

Referring to the drawings and more particularly to FIGS. 1 and 2, there is illustrated a flexible support device, generally indicated at 10, said device being mounted to a substantially stationary mounting unit, indicated generally by reference character 12, which is illustrated as an upper portion of a tripod having a platform 14 with downwardly extending legs 16 and an upwardly projecting threaded lug 18. Demountably secured to the upper end of the device 10 is a camera 20. It should be noted that the camera thus represented at 20 may be either a still or a movie camera, and almost all types of cameras are adapted with a threaded socket 22, as indicated in FIG. 1.

The flexible support device 10 comprises a flexible, elongated tubular body 24 made of a continuous spring-like coil, the lower end of which is secured to a mounting plate 26. Said mounting plate 26 is formed by a circular metal plate having an annular wall 28 defining a channel 30 in which the lower end of the coil 24 is therein received and affixed in any suitable manner such as welding, brazing or silver soldering (See FIG. 4.). Thus, a very firm engagement between the flexible body 24 and the mounting plate 26 is accomplished. In addition, said plate 26 is provided with a central bore 32 threaded to receive the lug 18 of the tripod 12.

Accordingly, there is provided a coupling means, generally indicated at 34, to which camera 20 is demountably attached. This coupling means comprises a fixed base plate 36 permanently welded to the upper end of said coiled body 24 in the like manner as described for the lower end. That is, the base plate 36 is defined by a circular plate having an annular channel or groove 38 formed by an annular lip or wall 40, as seen in FIG. 4, and thus provides a seat to receive the upper end of the coiled body 24 in which said coil is secured in like manner to that of the lower end thereof. A central bore 42 is also provided in the plate 36 through which a bolt 44 is freely received, said bolt comprising a head member 45 freely fitted adjacent the bottom face 46 of the plate 36, with the threaded portion 48 of bolt 44 extending upwardly through a central threaded bore 49 disposed within a mounting head 50. The threaded portion 48 of bolt 44 and the bore 49 are so arranged that said bolt is allowed to freely rotate within bore 42 of the base plate 36.

Hence, bolt 44 is demountably engaged with socket 22 of camera 20 by rotating the knurled mounting head 50, thereby bringing the upper face 52 of said head into a tight frictional engagement with face 54 of the camera 20. It can be seen, therefore, that camera 20 along with mounting head 50 are permitted to freely rotate about the central axis of the body in a complete 360° sweep.

Accordingly then, the camera is capable of being instantly motivated to various degrees horizontally and vertically to follow any action that might take place during a filming sequence. Thus, as shown in FIG. 2, the flexible spring action imparted therein can be implemented at any degree or angle so desired — yet allowing the camera to return to a normal-level horizontal mode, as shown in FIG. 1, when not held by the operator's hands, and also allowing it to remain upright without being locked in position — yet instantly ready to pivot and/or bend without the need to loosen any restraining clamps that are so often found or included in fixed support units.

Alternative Embodiment

Referring now to FIG. 6, there is illustrated an alternative embodiment of the present invention. This particular arrangement is identical in construction to that shown in FIGS. 1 through 5, with the exception of the configuration of the flexible coil body 52. As can be seen, the body 52 forms a somewhat truncated cone wherein the upper end 55 is provided with a smaller diameter than that of the lower end 56. Thus, the upper end has an inherent firmness not found in the lower end so that, when the body is forced to bend, the lower portion of the body will readily flex, eliminating undue strain in the area of the connection with the camera.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

I claim:

1. A flexible support device for removable attachment between a camera and a substantially-stationary mounting unit, said device comprising:
   a flexible tubular body defined by a continuous spring-like coil;
   a coupling means affixed to one end of said tubular body for demountably securing to said camera, and wherein said coupling means comprises a base plate secured to one end of said coil and having a centrally-disposed bore therein;
   a bolt freely received in the bore of said base plate, said bolt being provided with an enlarged head at one end thereof and a threaded portion at the opposite end thereof;
   a mounting head fixedly secured to the threaded end of said bolt and disposed adjacent the base plate for movement relative thereto, said mounting head being capable of freely rotating with said bolt about the vertical axis of said tubular body, said bolt extending therefrom for direct engagement with said camera, whereby said camera is allowed to rotate with said head; and
   a mounting plate secured to the opposite end of said tubular body having a centrally-disposed threaded bore therein, whereby said body is removably attached to said substantially-stationary mounting unit.

2. A flexible support device as recited in claim 1, wherein said mounting plate and said base plate include an annular channel disposed in each of said plates, whereby the respective ends of said tubular body are fixedly secured therein.

* * * * *